United States Patent
Hirose (10) Patent No.: US 6,361,465 B1
(45) Date of Patent: Mar. 26, 2002

(54) CONTROL DEVICE OF AUTOMATIC TRANSMISSION

(75) Inventor: Ikuo Hirose, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/598,100

(22) Filed: Jun. 21, 2000

(30) Foreign Application Priority Data

Jun. 25, 1999 (JP) .......................................... 11-180828

(51) Int. Cl.[7] .............................................. F16H 61/08
(52) U.S. Cl. ..................................................... 475/128
(58) Field of Search ................................ 475/116, 127, 475/128, 129, 130

(56) References Cited

U.S. PATENT DOCUMENTS

| | | | | |
|---|---|---|---|---|
| 5,285,880 A | * | 2/1994 | Minagawa et al. | 475/128 X |
| 5,288,279 A | * | 2/1994 | Sakai et al. | 475/127 |
| 5,697,860 A | * | 12/1997 | Shimei et al. | 475/128 |
| 5,779,585 A | * | 7/1998 | Tsukamoto et al. | 475/128 |
| 5,951,439 A | * | 9/1999 | Jang | 475/128 X |

* cited by examiner

Primary Examiner—Charles A. Marmor
Assistant Examiner—Ankur Parekh
(74) Attorney, Agent, or Firm—Rossi & Associates (57) ABSTRACT

An automatic transmission, which has automatic shift ranges and manual setting ranges having a first speed gear position at which an engine brake is operable, is constructed in such a manner that a first friction element engaged at the first speed gear position and at a backward driving gear position is connected to a pressure regulating valve controlled by a timing solenoid valve. If a gear position is automatically shifted from a gear position at which the first friction element is unengaged to a gear position at which the first friction element is engaged, the timing solenoid valve is kept on for a predetermined time to delay the engagement of the first friction element to thereby prevent the shock from the shift. If the gear position is manually shifted from a gear position at which the first friction element is unengaged to a gear position at which the first friction element is engaged, the timing solenoid valve is immediately switched to an OFF state to quickly engage the first friction element and obtain the engine brake.

5 Claims, 9 Drawing Sheets

| Gear position | C1 | C2 | C3 | B1 | OC1 | B2 | C4 | B3 | OC2 | Solenoid ||||||
|---|---|---|---|---|---|---|---|---|---|---|---|---|---|---|
| | | | | | | | | | | SA | SB | SC | SD | SE |
| 1st speed with engine brake | | | ○ | ○ | ○ | | | ○ | ○ | × | ○ | ○ | ○ | × |
| 1st speed without engine brake | | | ○ | | ○ | | | ○ | ○ | ○ | ○ | ○ | ○ | × |
| 2nd speed | | ○ | ○ | | | ○ | | ○ | ○ | ○ | ○ | × | ○ | × |
| 3rd speed | | ○ | ○ | | | | | ○ | ○ | × | ○ | × | ○ | × |
| 4th speed | | ○ | | | | ○ | ○ | ○ | ○ | × | × | ○ | ○ | × |
| 5th speed | | | | | | ○ | | | | ○ | × | ○ | ○ | ○ |
| Reverse | ○ | | | ○ | | | | ○ | | ○ | ○ | ○ | × | ○ |

CONTROL DEVICE OF AUTOMATIC TRANSMISSION

BACKGROUND OF THE INVENTION

1. Field of the Invention

The present invention relates to a control device of an automatic transmission for vehicles.

2. Description of the Prior Art

A conventional control device of an automatic transmission for vehicles is disclosed, for example, in Japanese Patent Application Laid-open Publication No. 2-304256. This automatic transmission comprises a main transmission mechanism arranged coaxially with a torque converter and a sub transmission mechanism arranged in parallel with the main transmission mechanism. In this automatic transmission, the control device achieves a plurality of gear positions by engaging and disengaging friction elements such as planetary gear mechanisms, clutches, brakes and one-way clutches.

In the control device of the automatic transmission, an automatic transmission control unit (hereinafter referred to as an ATCU) determines a gear position suitable for driving conditions, and on-off controls solenoid valves in the control device, thereby switching shift valves by an oil pressure supplied through the solenoid valves. The gear positions are changed by supplying and releasing oil pressure to and from friction elements by the shift valves.

An ordinary control device has a parking range, a rear driving range (hereinafter referred to as a R range), a neutral range, an automatic shift driving range (hereinafter referred to as a D range), a 3 range in which a vehicle is driven forward at a first, second or third speed gear position, a 2 range in which the vehicle is driven forward at the first or second speed gear position, a 1 range in which the vehicle is driven forward only at the first speed gear position.

The conventional control device of the automatic transmission switches the gear position from the fourth speed to the third speed by switching the sub transmission mechanism from a direct driven state to a reduction state. More specifically, the control device shifts the gear position from the fourth speed down to the third speed by disengaging a direct clutch that is engaged at the fourth speed gear position and engaging a reduction one-way clutch and a reduction brake that are unengaged at the fourth speed gear position.

An engagement pressure of the reduction brake is controlled by supply and release of an oil pressure due to the gear shift, and also can be controlled gradually for a predetermined time through a reduction accumulator provided in an oil channel which supplies and releases the engagement pressure.

The gear position is shifted from the fourth speed down to the third speed by an automatic down shift in the D range or a manual down shift in a case the 3 range is manually-selected.

Normally, the manual down-shift is performed in such a manner that a driver manually operates a shift lever for the purpose of driving the vehicle with an engine brake being operable. The reduction brake must be engaged upon the disengagement of the direct clutch in order to prevent the delay in functioning the engine brake. In this case, a high back pressure is supplied to the reduction accumulator to generate a high shelf pressure and stroke the reduction accumulator. Since the engagement pressure of the reduction brake is raised quickly, the reduction brake is engaged while the reduction accumulator is stroking. Consequently, the reduction brake is engaged just after the manual down-shift operation.

In the case of the automatic down-shift in the D range, it is necessary to direct the driving power from an input shaft to an output shaft since the driver would not like to drive the vehicle with the engine brake being operable. When the direct clutch is disengaged, the reduction one-way clutch is engaged to carry on the transmission of power for forward driving. This prevents a trouble in the shift even if the engagement of the reduction brake is delayed. Therefore, the back pressure is not supplied to the reduction accumulator, and the reduction accumulator is stroked at a low shelf pressure. The reduction brake engagement pressure is kept low for a predetermined time to delay the engagement of the reduction brake. This surely prevents the shock resulting from the shift.

Either in the manual down-shift or in the automatic down-shift, a line pressure is supplied directly to the reduction brake after a finish of the stroke of the reduction accumulator so that the reduction brake can be kept engaged.

If the R range is selected in the above prior art automatic transmission, the R range pressure is supplied as the back pressure to the reduction accumulator to maintain the state wherein the reduction accumulator has finished stroking. Thus, the line pressure is directly supplied to the reduction brake to cope with a large loaded torque in backward driving. A pressure regulating valve for reducing pressure is provided in an oil channel that supplies the engagement pressure to the low reverse brake in order to adjust the shock resulting from the shift.

However, the engagement pressure of the reduction brake must be kept low for a time required for the shift plus an allowance in order to surely prevent the shock resulting from the shift by delaying the engagement of the reduction brake in the automatic down-shift. The time in which the accumulator can control the oil pressure corresponds to the time in which the accumulator is stroking, and thus depends on the capacity of the accumulator. For this reason, the reduction accumulator must be quite large in order to keep the low engagement pressure of the reduction brake for a sufficient time. On the other hand, the vehicle is recently equipped with an increasing number of devices, and there is a strong requirement for reducing the size of each device. It is therefore necessary to reduce the size of the control device of the automatic transmission.

SUMMARY OF THE INVENTION

It is therefore an object of the present invention to provide a control device of an automatic transmission, which prevents the shock resulting from the shift in the automatic down-shift and is capable of quickly changing gear positions in the manual down-shift. It is another object of the present invention to provide a control device of an automatic transmission, which is capable of engaging friction elements by a sufficient engagement pressure in backward driving. It is yet another object of the present invention to provide a small control device of an automatic transmission.

The above objects can be accomplished by providing a control device of an automatic transmission, which comprises a plurality of forward driving gear positions and a backward driving gear position that are achieved by engaging and disengaging a plurality of friction elements and which is capable of changing the plurality of forward driving gear positions by an automatic shift or a manual shift according to driving conditions, the control device of the automatic transmission comprising: a first friction element that is engaged at least at a lowest speed forward driving gear position or at the backward driving gear position; a pressure regulating valve that is connected to an output oil channel connected to a first oil channel connected to the first friction element, a second oil channel supplied with an original pressure, a third oil channel that is drained if the forward driving gear position is designated and that is supplied with a rear range pressure if the backward driving gear position is designated, and a fourth oil channel supplied with an oil pressure for changing pressure regulating state, the pressure regulating valve outputting the rear range pressure to the output oil channel if the third oil channel is supplied with the rear range pressure, outputting an oil pressure regulated to such an extent as to engage the first friction element to the output oil channel if the third oil channel is drained and the fourth oil channel is not supplied with oil pressure, and outputting an oil pressure regulated according to the oil pressure supplied to the fourth oil channel if the third oil channel is drained and the fourth oil channel is supplied with the oil pressure; a first shift valve that is connected to the fourth oil channel, a fifth oil channel supplied with a control pressure for controlling the pressure regulating valve and a sixth oil channel connected to a timing solenoid valve, the first shift valve supplying a control pressure to the fourth oil channel by connecting the fifth oil channel and the fourth oil channel when the timing solenoid valve is turned off and draining the fourth oil channel when the timing solenoid valve is turned on; a shift control part that keeps the timing solenoid valve on for a predetermined time when the gear position is automatically shifted from a gear position at which the first friction element is unengaged to a gear position at which the first friction element is engaged, and then turns off the timing solenoid valve; and that switches the timing solenoid valve to an OFF state when the gear position is manually shifted from a gear position at which the first friction element is unengaged to a gear position at which the first friction element is engaged; and wherein an oil pressure for engaging the friction element is supplied to the first oil channel from the pressure regulating valve when the control pressure acts on the pressure regulating valve through the fourth oil channel.

Upon automatically shifting from the gear position at which the first friction element is not engaged is to the gear position at which the first friction element is engaged, the shift control part keeps the timing solenoid valve on for a predetermined time after the shift. Thus, the fourth oil channel is drained for the predetermined time after the shift.

At this time, the forward driving gear position is selected, and thus the third oil channel connected to the pressure regulating valve is drained. The fourth oil channel is also drained. No oil pressure is supplied to the third and fourth oil channels. Therefore, the first oil channel is supplied with an oil pressure, which is regulated to such an extent as not to engage the first friction element, from the pressure regulating valve.

On passage of the predetermined time, the shift control part turns off the timing solenoid valve to supply the fourth oil channel with the control pressure, which acts on the pressure regulating valve.

When the control pressure acts on the pressure regulating valve, the first oil channel is supplied with an oil pressure, which is regulated to such an extent as to engage the first friction element, through the pressure regulating valve. Thus, the first friction element for transmitting a reverse driving force is never engaged for the predetermined time after the automatic shift, and is engaged on passage of the predetermined time. This prevents the shock resulting from the shift.

In the case of the manual shift, the timing solenoid valve is turned off immediately after the shift. Thus, the fourth oil channel is supplied with the control pressure from the fifth oil channel, and the control pressure acts on the pressure regulating valve. When the control pressure acts on the regulating valve, the first oil channel is supplied with the oil channel, which is regulated to such an extent as to engage the first friction element, through the pressure regulating valve. Thus, the first friction element is engaged immediately after the manual shift, and this enables the quick change in the gear positions.

If the R range is selected, the rear range pressure supplied to the third oil channel is supplied to the first oil channel through the pressure regulating valve, so that a sufficient engagement pressure can be quickly supplied to the first friction element. It is possible to prevent the shock resulting from the shift in the automatic down shift, quickly change the gear positions in the manual down shift, and engage the friction element by the sufficient engagement pressure in the backward driving with the use of the regulating valve, the shift valves and the timing solenoid valve with a small capacity without using the accumulator with a large capacity as in the prior art. This reduces the size of the control device of the automatic transmission.

According to the second aspect of the present invention, the control device of the automatic transmission further comprises: a second friction element that is unengaged at a gear position at which the first friction element is unengaged and that is engaged at least at one gear position among gear positions at which the friction element is engaged; a seventh oil channel connected to the output oil channel; an eighth oil channel connected to the second friction element; and an oil pressure circuit connecting the seventh oil channel and the eighth oil channel if a gear position at which the second friction element is engaged is designated.

Accordingly, the oil pressure from the output oil channel of the pressure regulating valve is supplied as the engagement pressure to the second friction element at the gear position at which the second friction element is necessary to be engaged. The pressure regulating valve producing the engagement pressure of the first friction element can also be used as the pressure regulating valve reducing the engagement pressure supplied to the second friction element. This further reduces the size of the control device of the automatic transmission.

Depending on the arrangement of the pressure regulating valve, the first oil channel connected to the first friction element may be connected directly to the output oil channel of the pressure regulating valve. Alternatively, the first oil channel may be connected to the output oil channel through the oil pressure circuit.

The original pressure can be supplied to the pressure regulating valve directly or via the oil pressure circuit.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of the present invention will be described below.

Figure 1:
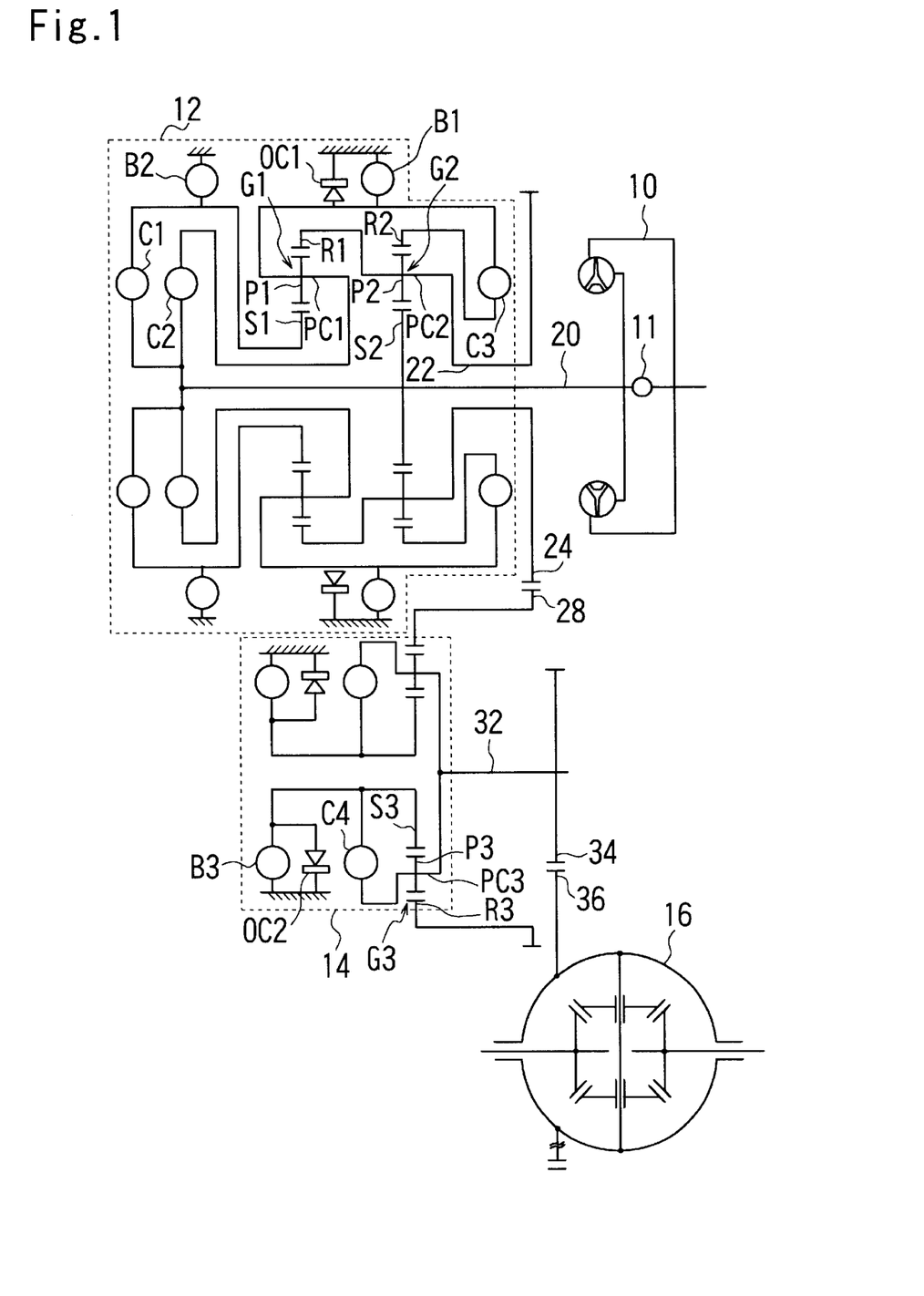
FIG. 1 is a schematic diagram showing a power transmission device of an automatic transmission according to the present invention.

The present embodiment is applied to an automatic transmission having a power transmission device that is capable of changing gear positions at five positions in forward driving and one position in backward driving. The power transmission device has a torque converter 10, a main transmission mechanism 12, a sub transmission mechanism 14, and a final drive mechanism 16 for driving wheels. The main transmission mechanism 12 is coaxial with the torque converter 10, and the sub transmission mechanism 14 is parallel with the main transmission mechanism 12.

A lock-up mechanism 11 is attached to the torque converter 10, which receives a torque from an engine (not shown). An output of the torque converter 10 is inputted to the main transmission mechanism 12 through a shaft 20.

The main transmission mechanism 12 comprises a first planetary gear mechanism G1, a second planetary gear mechanism G2, a reverse clutch C1, a high clutch C2, a low clutch C3, a low reverse brake B1, a 2-4 brake B2, and a low one-way clutch OC1. The main transmission mechanism 12 converts the torque inputted from the shaft 20 and outputs the converted torque to a shaft 22.

The first planetary gear mechanism G1 is arranged on the shaft 20, and comprises a sun gear S1, an internal gear R1, a pinion gear P1 that is engaged with the sun gear S1 and the internal gear R1 at the same time, and a carrier PC1 that supports the pinion gear P1. The second planetary gear mechanism G2 is also arranged on the shaft 20, and comprises a sun gear S2, an internal gear R2, a pinion gear P2 that is engaged with the sun gear S2 and the internal gear R2 at the same time, and a carrier PC2 that supports the pinion gear P2.

The reverse clutch C1, the high clutch C2, the low clutch C3, the low reverse brake B1, the 2-4 brake B2 and the low one-way clutch OC1 are operated in a variety of combinations. It is therefore possible to change the rotational conditions of each elements of the first planetary gear mechanism G1 and the second planetary gear mechanism G2, and change the rotation speed of the shaft 22 with respect to the rotation speed of the shaft 20. The shaft 22 is integrated with a main output gear 24, which is engaged with a sub input gear 28 connected to the sub transmission mechanism 14.

The sub transmission mechanism 14 has a third planetary gear mechanism G3, a direct clutch C4, a reduction brake B3 and a reduction one-way clutch OC2. The sub transmission mechanism 14 converts the torque inputted from the sub input gear 28 and outputs the converted torque to a shaft 32. The third planetary gear mechanism G3 comprises a sun gear S3, an internal gear R3 that is integrally connected to the sub input gear 28, a pinion gear P3 that is engaged with the sun gear S3 and the internal gear R3 at the same time, and a carrier PC3 that supports the pinion gear P3 and is connected to the shaft 32 in such a manner as to rotate integrally with the shaft 32.

The direct clutch C4, the reduction brake B3 and the reduction one-way clutch OC2 are operated in a variety of combinations. It is therefore possible to change the rotational conditions of elements of the third planetary gear mechanism G3, and change the rotation speed of the shaft 32 with respect to the rotation speed inputted from the sub input gear 28.

The shaft 32 is integrated with a sub output gear 34, and is engaged with a final gear 36 that is connected to the final drive mechanism 16 in such a manner as to rotate integrally with the final drive mechanism 16.

The torque inputted from the engine to the automatic transmission is sequentially transmitted to the torque converter 10, the shaft 20, the main transmission mechanism 12, the main output gear 24, the sub input gear 28, the sub transmission mechanism 14, the shaft 32, the sub output gear 34, the final gear 36 and the final drive mechanism 16.

Figure 2:
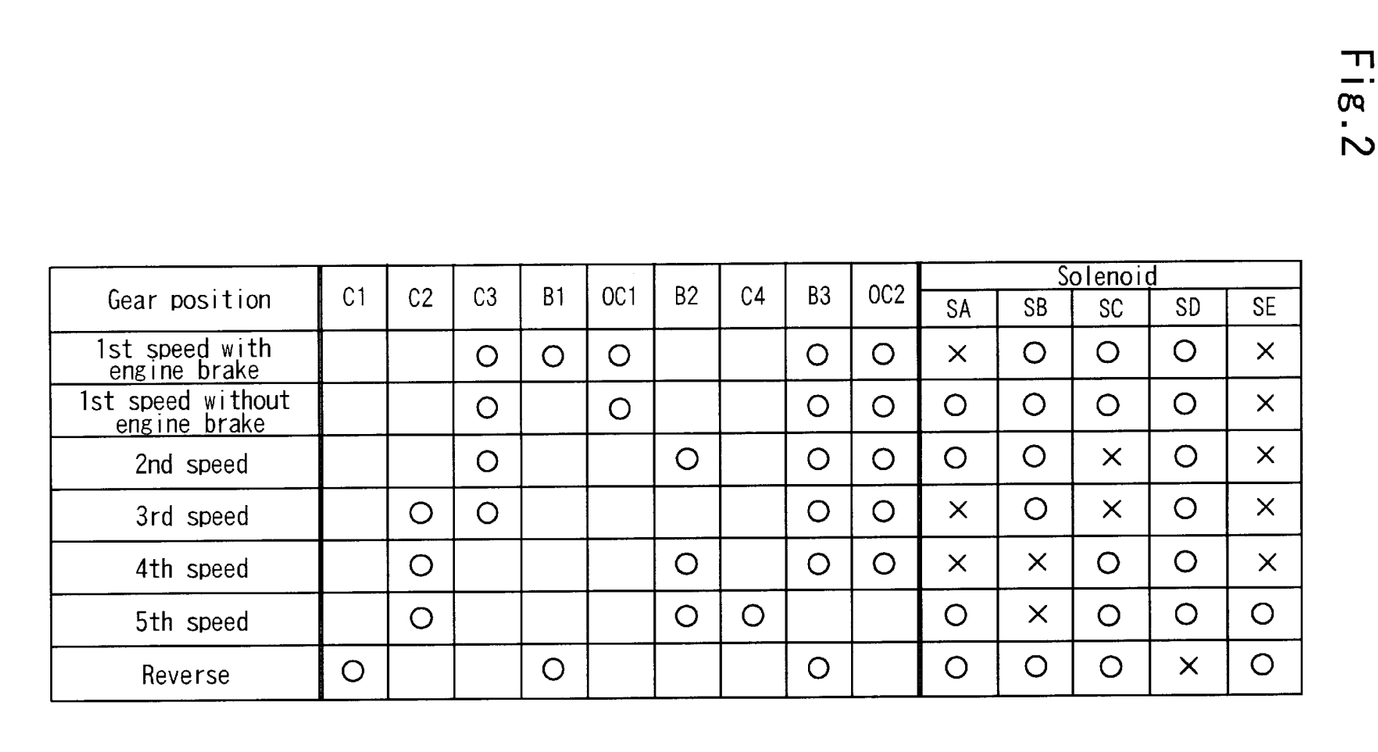
FIG. 2 is a view showing operational combinations of friction elements for changing gear positions.

During the transmission of the torque; the clutches, the brakes, etc. are operated in such combinations as shown in FIG. 2 to thereby change gears at five positions in forward driving and one position in backward driving. A circular mark indicates the engaged state. At a combination referred to as a first speed without engine brake, a reverse torque from the engine (corresponding to a torque from the wheels) is not transmitted, and the engine brake is not operable. At other gear positions, the reverse torque is transmitted, and the engine brake is operable. A relationship between the ON-OFF state of solenoid valves and the gear positions will be described later.

A driver uses a shift lever to designate a desired range among a parking range, an R range, a neutral range, a D range for automatically changing gears at five positions in the forward driving, a 4 range for automatically changing gears at four positions under the fifth speed gear position in the forward driving, a 3 range for automatically changing gears at three positions under the fourth speed gear position in the forward driving, a 2 range for automatically changing gears at two positions under the third speed gear position in the forward driving, and a 1 range for setting the first speed gear position.

If the driver designates the D range, the gears can be shifted at five positions in the forward driving according to driving conditions. The engine brake is operable from the fifth to second speed gear positions, but it is not operable if the first speed gear position is automatically selected.

If the 4 range is designated, the gear can be shifted at four positions in the forward driving between the first speed gear position and the fourth speed gear position. In this case, the vehicle is driven with the engine brake being operable at all the gear positions.

If a 3 range is designated, the gear can be shifted at three positions in the forward driving between the first speed gear position and the third speed gear position. In this case, the vehicle is driven with the engine brake being operable at all the gear positions.

If the 2 range is designated, the gear can be shifted at two positions in the forward driving between the first speed gear position and the second speed gear position. The engine brake is operable at all the gear positions.

If the 1 range is disignated, the vehicle is driven with the engine brake being operable.

Each of the 2 range and the 1 range forms a low-speed engine brake ranges.

Figure 3:
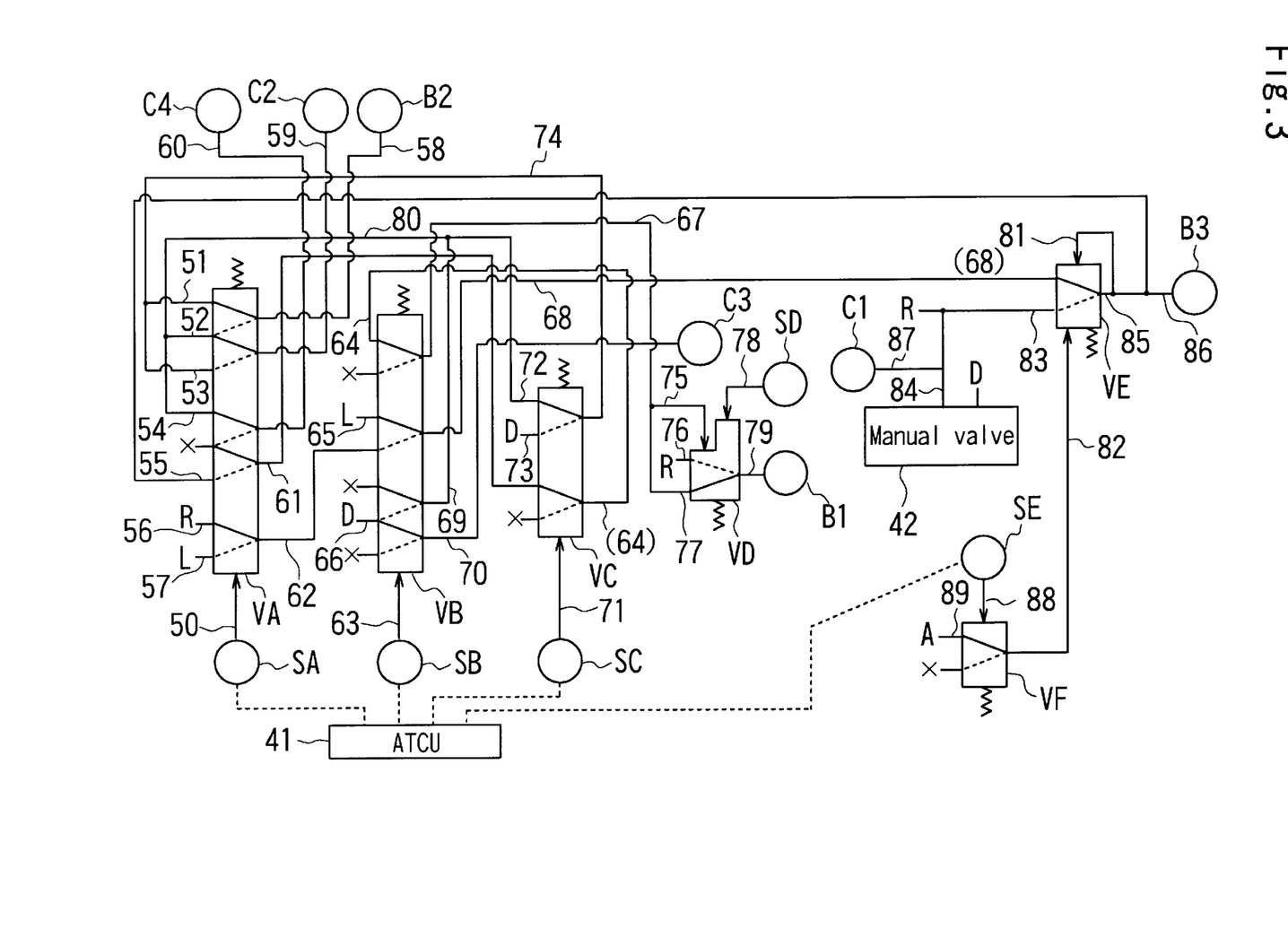
FIG. 3 is a view showing the structure of a preferred embodiment of the present invention.

FIG. 3 shows a part of an oil pressure control circuit of the power transmission device, which is directly related to the present invention. The oil pressure control circuit controls an oil pressure supplied to the reverse clutch C1, the high clutch C2, the low clutch C3, the direct clutch C4, the 2-4 brake B2 and the reduction brake B3. The oil pressure control circuit comprises three shift valves VA, VB, VC that control the engagement and disengagement, a reverse inhibit valve VD for controlling an oil pressure supplied to the low reverse brake B1, a reduction reducing valve VE for controlling an oil pressure and an engaging timing of the reduction brake B3 when the gear is shifted down from the fifth speed to the forth speed gear position, a reduction timing valve VF, a solenoid valve SA, a solenoid valve SB, a solenoid valve SC, a low clutch timing solenoid valve SD, a reduction timing solenoid valve SE, and an ATCU 41 for controlling the ON/OFF of each solenoid valve, a manual valve 42, and oil channels 50–89.

Each shift valve is switched by supplying and releasing the oil pressure applied to a valve end face, and changes the connecting state of oil channels. Each solenoid valve is on-off controlled by the ATCU 41, and controls the supply and release of the oil pressure applied to end faces of the shift valves.

A description will now be given of the connecting state of the oil channels in each shift valve.

First, on the upper end face of the shift valve VA a spring force is applied in a press down direction, and on the lower end face of the shift valve VA an oil pressure supplied through the oil channel 50 is applied in a press up direction. When the oil pressure is supplied to the oil channel 50, the shift valve VA is pressed up and is brought into the first state wherein the right and left oil channels thereof communicate with one another as indicated by solid lines. More specifically, the oil channel 51 connects with the oil channel 58, the oil channel 52 connects with the oil channel 59, the oil channel 54 connects with the oil channel 60, and the oil channel 56 connects with the oil channel 62. The oil channel 61 is drained through a drain port (indicated by a mark X in FIG. 3).

If the oil pressure is not supplied to the oil channel 50 of the shift valve VA, the shift valve VA is pressed down by the spring force and brought into the second state. The right and left oil channels of the shift valve VA communicate with one another as indicated by broken lines in the second state. More specifically, the oil channel 52 connects with the oil channel 58, the oil channel 53 connects with the oil channel 59, the oil channel 55 connects with the oil channel 61, and the oil channel 57 connects with the oil channel 62. The oil channel 60 is drained.

The oil channel 58 connects with the 2-4 brake B2, the oil channel 59 connects with the high clutch C2, and the oil channel 60 connects with the direct clutch C4. The oil channel 61 connects with the shift valve VC, and the oil channel 62 connects with the shift valve VB.

As to the shift valve VB, a spring force is applied in a press down direction, and the oil pressure supplied to the oil channel 63 is applied in a press up direction.

When the oil pressure is supplied to the oil channel 63, the shift valve VB is pressed up and brought into the first state. In this first state, the oil channel 64 connects with the oil channel 67, the oil channel 65 connects with the oil channel 68, and the oil channel 66 connects with the oil channel 70 as indicated by solid lines. The oil channel 69 is drained.

If the oil pressure is not supplied to the oil channel 63 of the shift valve VB, the shift valve VB is pressed down and brought into the second state. In the second state, the oil channel 62 connects with the oil channel 68, and the oil channel 66 connects with the oil channel 69 as indicated by broken lines. The oil channels 67 and 70 are drained. The oil channel 67 connects with oil channels 75 and 77, and the oil channel 68 connects with the reduction brake B3. The oil channel 69 connects with the oil channels 52 and 54 through an oil channel 80, and the oil channel 69 also connects with an oil channel 72. The oil channel 70 connects with the low clutch C3.

As to the shift valve VC, a spring force is applied in a press down direction, and an oil pressure supplied to an oil channel 71 is applied in a press up direction. When the oil pressure is supplied to the oil channel 71, the shift valve VC is pressed up and brought into the first state. In this first state, the oil channel 72 connects with the oil channel 74, and the oil channel 61 connects with the oil channel 64 as indicated by solid lines. If the oil pressure is not supplied to the oil channel 71 of the shift valve VC, the shift valve VC is pressed down and brought into the second state. In the second state, the oil channel 73 connects with the oil channel 74 as indicated by broken lines. The oil channel 64 is drained. The oil channel 74 connects with the oil channels 51 and 53.

An oil pressure supplied to the oil channel 75 and an oil pressure supplied to the oil channel 78 press down the reverse inhibit valve VD, and a spring force presses up the reverse inhibit valve VD.

When the oil pressure is supplied to the oil channel 75 or 78, the reverse inhibit valve VD is pressed down so that the oil channel 77 can connect with the oil channel 79 as indicated by a solid line. If the oil pressure is not supplied to the oil channel 75 and 78 of the reverse inhibit valve VD, the reverse inhibit valve VD is pressed up so that the oil channel 76 can communicate with the oil channel 79 as indicated by a broken line. The oil channel 78 connects with a low clutch timing solenoid valve SD, and the oil channel 79 connects with the low reverse brake B1.

The oil channels 66 and 73 are connected to the manual valve 42. These oil channels are supplied with a D range pressure (denoted by D in FIG. 3) if the driver designates the D range, the 4 range, the 3 range, the 2 range or the 1 range, in other words, if the driver designates the forward driving gear positions.

The oil channels 56 and 76 are also connected to the manual valve 42 through the oil channel 84. If the driver designates the R range, these oil channels are supplied with a R range pressure (denoted by R in FIG. 3) which is higher than a line pressure. If a range other than the R range is designated, the oil channel 84 is drained.

The oil channel 84 is connected to the reverse clutch C1 through the oil channel 87. The oil channels 57 and 65 are connected to a pilot valve (not shown), and is regularly supplied with a line pressure (denoted by L in FIG. 3) that is regulated by the pilot valve. While the forward driving gear position is selected, the low clutch timing solenoid valve SD is kept on to press down the reverse inhibit valve VD. This prevents the oil pressure from being supplied to the low reverse brake B1 even if the oil pressure is generated in the oil channel 76 under some abnormal conditions.

The reduction reducing valve VE is a pressure regulating valve, an oil pressure supplied to the oil channel 81 presses down the reduction reducing valve VE in FIG. 3. An oil pressure supplied to the oil channel 82 and a spring force press up the reduction reducing valve VE. The oil channel 83 is connected to the manual valve 42 through the oil channel 84. If the R range is designated, an R range pressure is supplied to the oil channel 83. If a range other than the R range is designated, the oil channel 83 is drained.

There will now be explained the connecting state of oil channels in the case where the oil channel 68 is supplied with the line pressure, the oil channel 83 is drained, and no oil pressure is supplied to the oil channel 82. If the downward pressing force by the oil pressure of the oil channel 85 connected to the oil channel 81 is smaller than the upward pressing force of the spring, the valve is pressed up and the oil pressure of the oil channel 85 becomes closer to the line pressure supplied to the oil channel 68. To the contrary, if the downward pressing force of the oil pressure of the oil channel 85 is larger than the upward pressing force of the spring, the valve is pressed down and the oil pressure of the oil channel 85 is drained through the oil channel 83.

If the oil pressure of the oil channel 85 is high, the oil channel 85 is drained to lower the oil pressure thereof. If the oil pressure of the oil channel 85 is low, the line pressure is supplied to the oil channel 85 to raise the oil pressure thereof. This regulates the pressure of the oil channel 85 so that the downward pressing force of the oil pressure supplied to the oil channel 85 and the upward pressing force of the spring can be balanced. The spring force is predetermined so that the oil pressure supplied to the oil channel 85 never engages the reduction brake B3. Thus, the line pressure supplied to the oil channel 68 is reduced substantially, and is then supplied to the oil channel 85.

If the oil channel 68 is supplied with the line pressure, the oil channel 83 is drained, and the oil channel 82 is supplied with the oil pressure; the oil channel 85 is regulated so as to balance the downward pressing force of the oil pressure supplied to the oil channel 85 and the sum of the upward pressing force of the spring force and the upward pressing force of the oil pressure supplied to the oil channel 82. In this case, the oil pressure supplied to the oil channel 85 is regulated to be larger than the oil pressure outputted from the oil channel 85 when no oil pressure is supplied to the oil channel 82. However, the oil pressure supplied to the oil channel 85 is never larger than the line pressure supplied to the oil channel 68.

If the R range pressure is supplied to the oil channel 83, the oil pressure of the oil channel 85 is never drained. Thus, the valve is pressed down, and the oil channel 83 connects with the oil channel 85 as indicated by a broken line in FIG. 3. Therefore, the R range pressure is supplied to the oil channel 85. The oil channel 82 connects with the reduction timing valve VF, and the oil channel 85 connects with the oil channel 86 connected to the reduction brake B3 and the oil channel 55. The R range pressure outputted from the manual valve 42 is also supplied to the reverse clutch C1 through the oil channels 84 and 87.

The reduction timing solenoid valve VF is pressed down by the oil pressure of the oil channel 88 connected to the reduction timing solenoid valve SE, and is pressed up by the spring force. When the reduction timing solenoid valve SE is turned on to supply the oil pressure to the oil channel 88, the reduction timing valve VF is pressed down and the oil channel 82 is drained as indicated by a broken line.

If the reduction timing solenoid valve SE is off and the oil channel 88 is supplied with no oil pressure, the reduction timing valve VF is pressed up to thereby connect the oil channel 89 with the oil channel 82 as indicated by a solid line. The oil channel 89 is supplied with an accumulation control pressure (denoted by A in FIG. 3) from an accumulation control valve (not shown). If the accumulation control pressure acts on the reduction reducing valve VE through the reduction timing valve VF and the oil channel 82, the reduction reducing valve VE reduces the line pressure to such a level that the reduction brake B3 can be engaged and outputs the reduced line pressure to the oil channel 85.

If the driver manually designates the D range as the shift position, the ATCU 41 selects a suitable gear position from the five gear positions for forward driving according to the driving conditions. Then, the ATCU 41 controls the ON/OFF state of the solenoid valves SA, SB and SC according to the selected gear position.

If the driver designates the 3 range, the ATCU 41 selects a suitable gear position from the three gear positions under the fourth speed gear position for forward driving according to the driving conditions. If the driver designates the 2 range, the ATCU 41 selects a suitable gear position under the third speed gear position for forward driving according to the driving conditions. The ATCU 41 controls the ON/OFF state of the solenoid valves SA, SB and SC according to the selected gear position.

Upon selecting the fifth speed gear position or the backward driving gear position, the ATCU 41 keeps the reduction timing solenoid valve SE on. When the forward driving gear position under the fifth speed gear position is selected, the ATCU 41 turns off the reduction timing solenoid valve SE. However, the ATCU 41 controls other solenoid valves in different manners if the gear position is automatically shifted from the fifth speed to the fourth speed, i.e., if the gear position is shifted from the fifth speed gear position in the D range down to the fourth speed gear position in the D range, and if the gear position is manually shifted from the fifth speed to the fourth speed, i.e., if the gear position is shifted from the fifth speed in the D range down to the fourth speed in the 4 range.

If the gear position is shifted from the fifth speed down to the fourth speed in the D range, the ATCU 41 keeps the reduction timing solenoid valve SE on for a predetermined period of time and then turns off the reduction timing solenoid valve SE. If the gear position is shifted from the fifth speed in the D range down to the fourth speed in the 4 range, the reduction timing solenoid valve SE is immediately turned off.

There will now be described the oil pressure supplied state at gear positions relating to the present invention.

First, there will be described the oil pressure supplied state at the fifth speed gear position as the first forward driving gear position.

Figure 4:
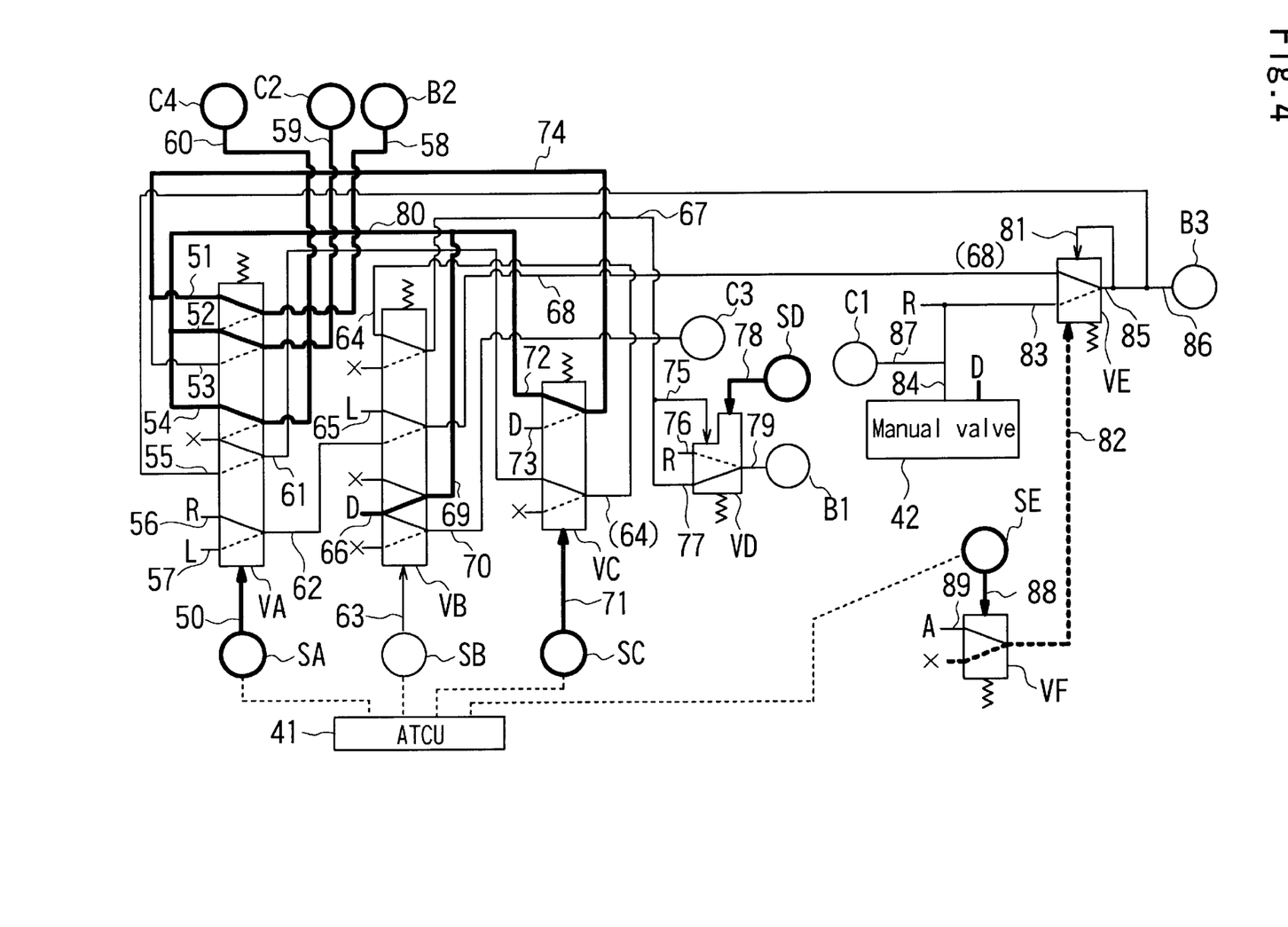
FIG. 4 is a view showing the ON/OFF state of solenoid valves and the connecting state of oil channels in the case where the fifth speed gear position is selected in the D range.

FIG. 4 shows the oil pressure supplied state in the case where the fifth speed gear position is selected in the D range. The ATCU 41 keeps the solenoid valves SA and SC on, and keeps the solenoid valve SB off. Therefore, the shift valves VA and VC are in the first state, and the shift valve VB is in the second state. In this case, the D range pressure supplied to the oil channel 66 is supplied to the high clutch C2 through the shift valve VB, the oil channel 69, the oil channel 80, the oil channel 52, the shift valve VA and the oil channel 59. The high clutch C2 is engaged.

The D range pressure supplied to the oil channel 80 is supplied to the direct clutch C4 through the oil channel 54, the shift valve VA and the oil channel 60. The direct clutch C4 is engaged, too. The D range pressure supplied to the oil channel 69 is supplied to the 2-4 brake B2 through the oil channel 72, the shift valve VC, the oil channel 74, the oil channel 51, the shift valve VA and the oil channel 58. The 2-4 brake B2 is engaged, too.

No oil pressure is supplied to the oil channels connected to the low reverse brake B1, the reduction brake B3, the reverse clutch C1 and the low clutch C3 since they do not connect with the oil channels supplied with the oil pressure. Thus, the low reverse brake B1, the reduction brake B3, the reverse clutch C1 and the low clutch C3 are disengaged. Although the low clutch timing solenoid valve SD is on, it does not affect the connection of the oil channels. The reduction timing solenoid valve SE is on, and the oil channel 82 is drained as indicated by broken lines in FIG. 4.

Figure 5:
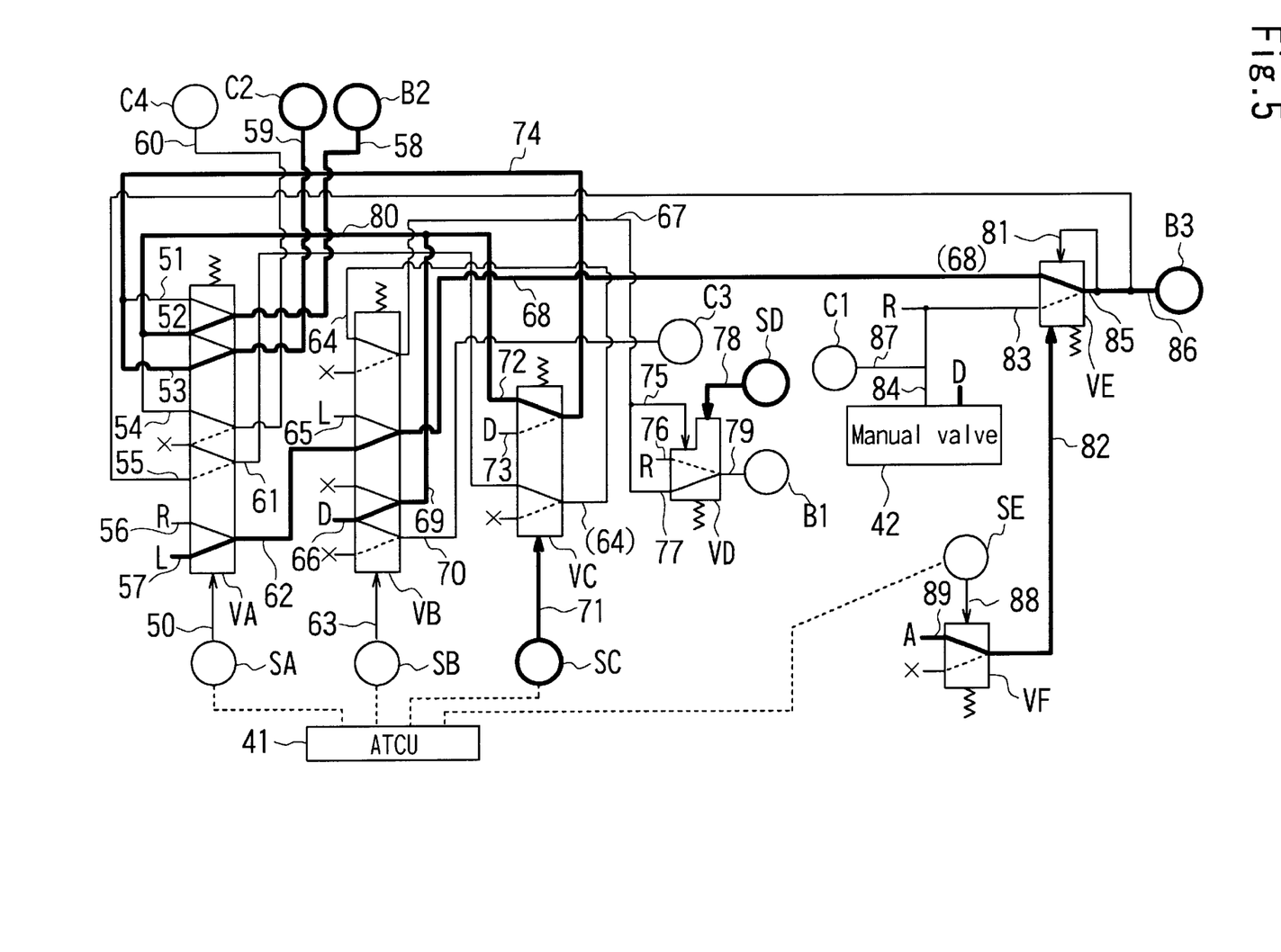
FIG. 5 is a view showing the ON/OFF state of solenoid valves and the connecting state of oil channels in the case where the gear position is manually switched from the fifth speed gear position in the D range to the fourth speed gear position.

FIG. 5 shows the oil pressure supplied state in the case at the fourth speed gear position that is switched from the fifth speed gear position in such a manner that the driver manually switches the range to the 4 range for the purpose of obtaining the engine brake while the vehicle is driven at the fifth speed gear position in the D range. The solenoid valves SA and SB are controlled to be on, and the shift valves VA and VB are in the second state. The solenoid valve SC is controlled to be on, and the shift valve VC is brought into the first state.

In this case, the D range pressure supplied to the oil channel 66 is supplied to the 2-4 brake B2 through the oil channel 69, the oil channel 80, the oil channel 52, the shift valve VA and the oil channel 58. The 2-4 brake B2 is also engaged. The D range pressure supplied to the oil channel 69 is supplied to the high clutch C2 through the oil channel 72, the shift valve VC, the oil channel 74, the oil channel 53, the shift valve VA and the oil channel 59. The high clutch C2 is also engaged.

The line pressure supplied to the oil channel 57 is supplied to the oil channel 68 through the shift valve VA, the oil channel 62 and the shift valve VB.

If the gear position is manually shifted from the fifth speed to the fourth speed, the ATCU 41 turns off the reduction timing solenoid valve SE just after the shift. Thus, the oil channel 89 connects with the oil channel 82, and the oil channel 82 is supplied with the accumulation control pressure. For this reason, the oil pressure of the oil channel 85 is regulated to balance the sum of the spring force and the accumulation control pressure supplied to the oil channel 82 and the oil pressure outputted to the oil channel 85. Therefore, the line pressure of the oil channel 68 is slightly reduced through the reduction reducing valve VE and is supplied to the reduction brake B3. The accumulation control pressure is predetermined so that the oil pressure of the oil channel 85 at this time can engage the reduction brake B3. Accordingly, the reduction brake B3 is immediately engaged, and this completes the shift.

The oil channels connected to the low reverse brake B1, the reverse clutch C1, the low clutch C3 and the direct clutch C4 are not supplied with the oil pressure since they do not connect with the oil channels supplied with the oil pressure. The low reverse brake B1, the reverse clutch C1, the low clutch C3 and the direct clutch C4 are disengaged.

Figure 6:
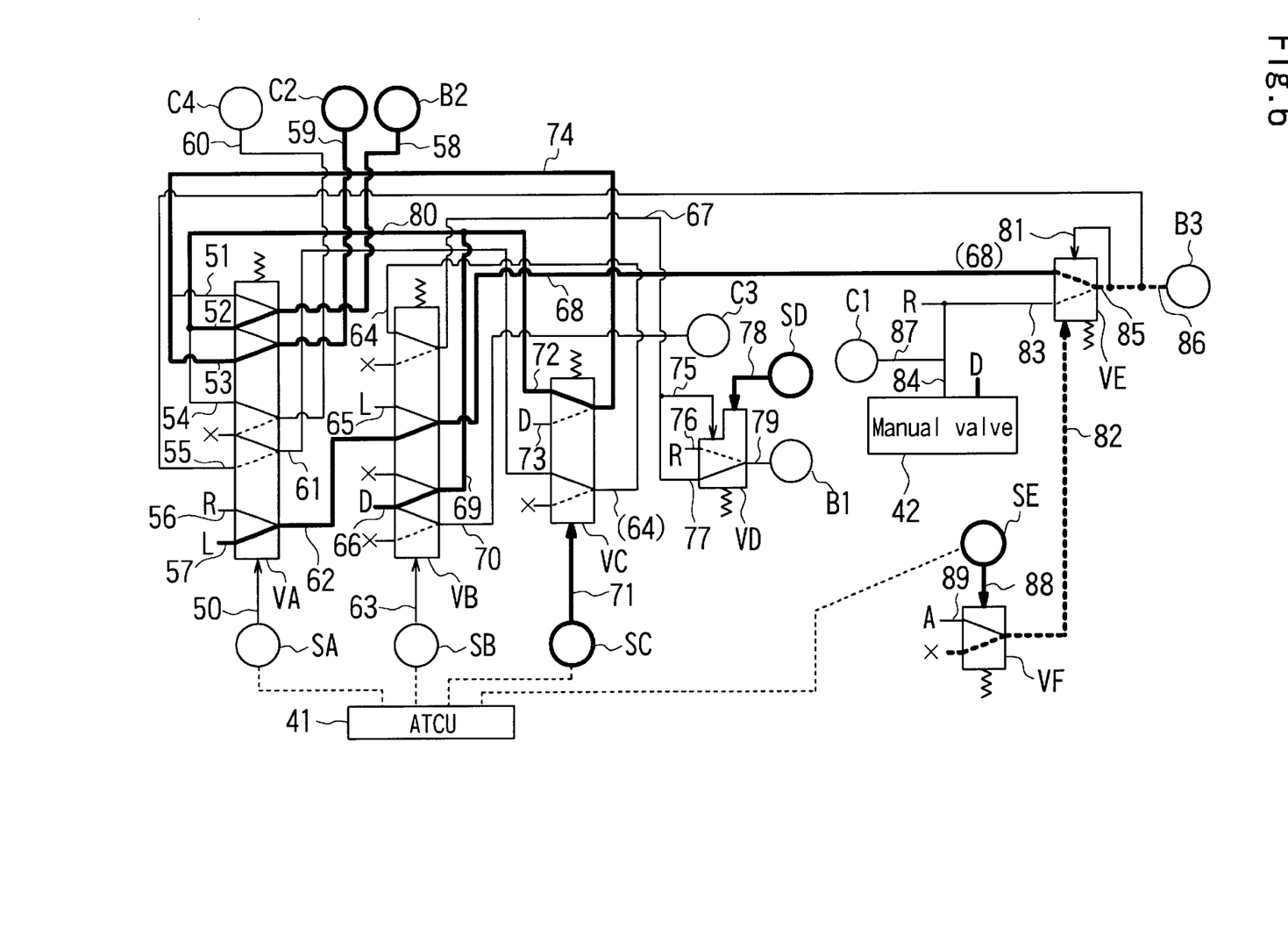
FIG. 6 is a view showing the ON/OFF state of solenoid valves and the connecting state of oil channels in the case where the fifth speed gear position is automatically switched to the fourth speed gear position in the D range.

FIG. 6 shows the oil pressure supplied state at the fourth speed gear position just after the gear position is automatically shifted to the fourth speed while the vehicle is running at the fifth speed gear position in the D range. As is the case with the manual shift shown in FIG. 5, the solenoid valves SA and SB are controlled to be off, and the shift valves VA and VB are brought into the second state. The solenoid valve SC is controlled to be on, and the shift valve VC is brought into the first state to engage the 2-4 brake B2 and the high clutch C2.

The line pressure supplied to the oil channel 57 is supplied to the oil channel 68 through the shift valve VA, the oil channel 62 and the shift valve VB. If the gear position is automatically shifted from the fifth speed to the fourth speed, the ATCU 41 keeps the reduction timing solenoid valve SE on for a predetermined time after the shift, so that the oil channel 82 is drained as indicated by broken lines.

For this reason, the oil pressure of the oil channel 85 is regulated to balance the spring force and the oil pressure outputted to the oil channel 85. Accordingly, the line pressure of the oil channel 68 is substantially reduced through the reduction reducing valve VE and is supplied to the reduction brake B3.

The spring force is predetermined so that the oil pressure of the oil channel 85 at this time cannot engage the reduction brake B3. Accordingly, the reduction brake B3 is never engaged while the reduction timing solenoid valve SE is on. On passage of a predetermined time, the ATCU 41 turns off the reduction timing solenoid valve SE, and the state shifts to that shown in FIG. 5, in which the reduction brake B3 is engaged to complete the shift.

Figure 7:
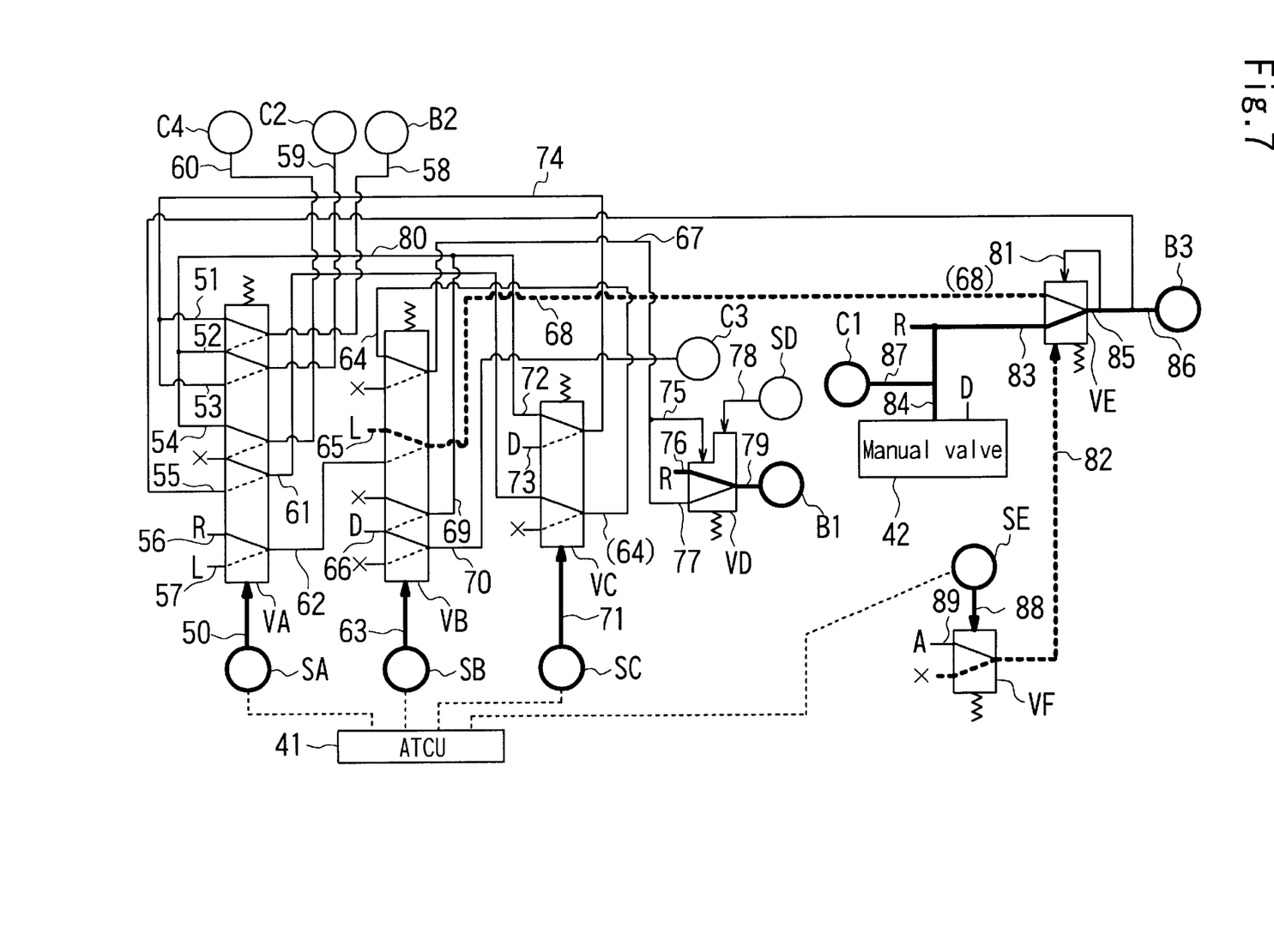
FIG. 7 is a view showing the ON/OFF state of solenoid valves and the connecting state of oil channels in the case where the R range is selected.

FIG. 7 shows the connecting state of the oil channels in the case where the R range is designated. The solenoid valves SA, SB and SC are controlled to be on. The shift valves are not supplied with the D range pressure, and the R range pressure is supplied to them through the oil channel 84 of the manual valve 42. The low clutch timing solenoid valve SD is controlled to be off, and the reduction timing solenoid valve SE is controlled to be on. In this case, the reverse inhibit valve VD shifts upward, and the oil channel 76 connects with the oil channel 79. The oil channel 79 is supplied with the R range pressure, and the low reverse brake B1 is engaged.

The R range pressure is supplied to the reverse clutch C1 through the oil channels 84 and 87, and thus the reverse clutch C1 is engaged, too. Since the line pressure is supplied to the oil channel 68 as indicated by broken lines, the oil pressure supplied to the oil channel 85 acts on the valves through the oil channel 81 to press down the reduction reducing valve VE.

Once the reduction reducing valve VE is pressed down, the oil pressure from the oil channel 83 supplied with the R range pressure is also supplied to the oil channel 85 to increase the oil pressure of the oil channel 81. Therefore, the reduction reducing valve VE is further pressed downward. Therefore, the oil channel 83 connects with the oil channel 85. This supplies the R range pressure to the oil channel 85 and engages the reduction brake B3.

Since the R range pressure is preset to be higher than the line pressure, the reduction brake B3 is engaged more securely than in the case where the forward driving gear position is selected. This enables the reduction brake B3 to cope with a large loaded torque in the backward driving.

Figure 8:
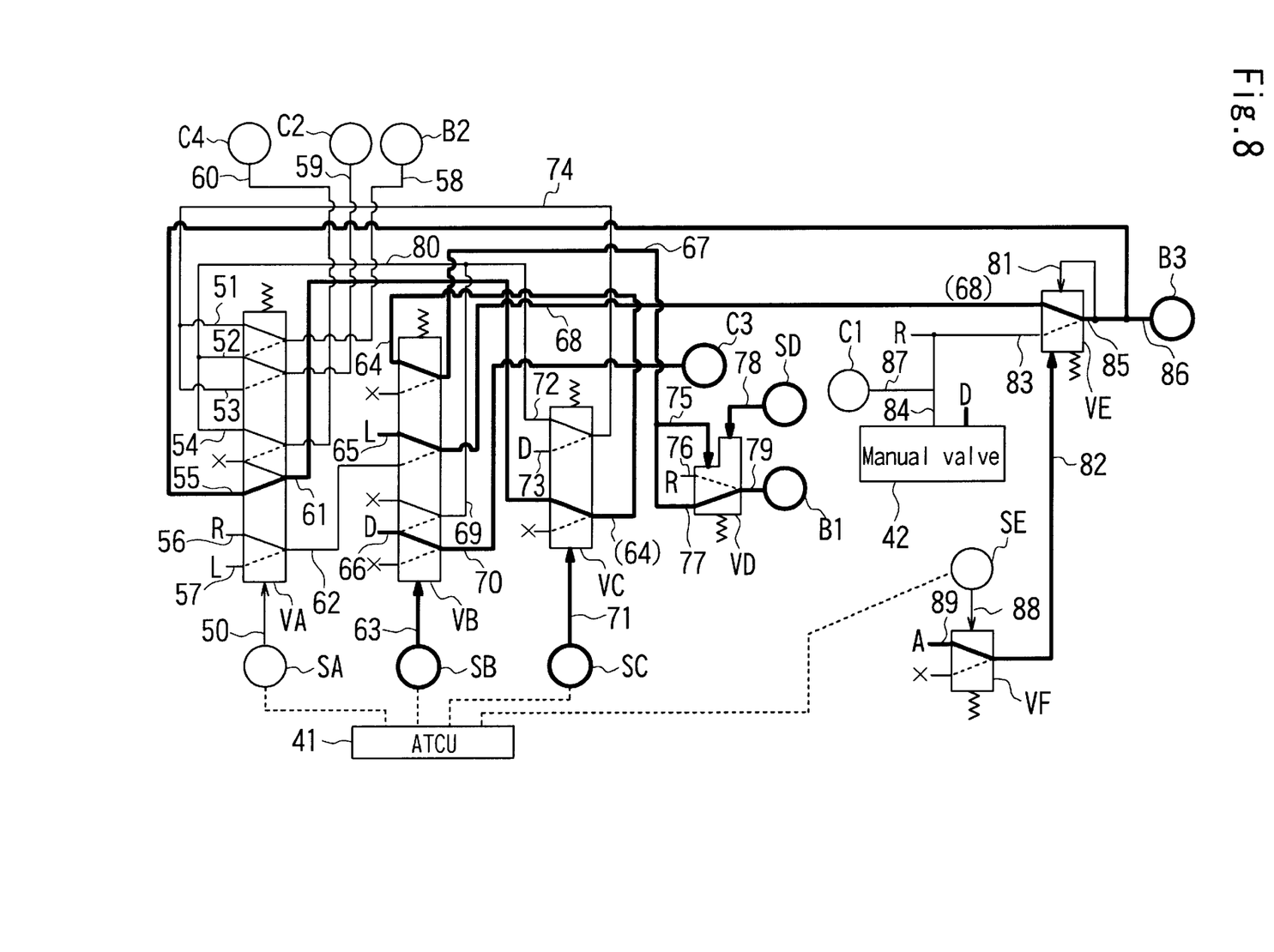
FIG. 8 is a view showing the ON/OFF state of solenoid valves and the connecting state of oil channels in the case where the first speed gear position is selected in the 1 range.

FIG. 8 shows the oil pressure supplied state in the case where the first speed gear position in the 1 range is designated. The solenoid valve SA is controlled to be off, and the shift valve VA is in the second state. The solenoid valves SB and SC are controlled to be on, and the shift valves VB and VC are in the first state. The low clutch timing solenoid valve SD is controlled to be on, and the reduction timing solenoid valve SE is controlled to be off.

In this case, the D range pressure supplied to the oil channel 66 is supplied to the low clutch C3 through the shift valve VB and the oil channel 70, so that the low clutch C3 is engaged. The line pressure supplied to the oil channel 65 is supplied to the oil channel 68 through the shift valve VB, and is slightly reduced by the reduction reducing valve VE. The reduced line pressure is outputted to the oil channels 85 and 86 to engage the reduction brake B3. The oil pressure, which is reduced by the reduction reducing valve VE and is outputted to the oil channel 85, is supplied the low reverse brake B1 through the oil channel 55, the shift valve VA, the oil channel 61, the shift valve VC, the oil channel 64, the shift valve VB, the oil channel 67, the oil channel 77, the shift valve VD and the oil channel 79, so that the low reverse brake B1 is engaged, too.

Accordingly, when the gear position is automatically shifted from the fifth speed to the fourth speed, the ATCU 41 keeps the reduction timing solenoid valve SE on for a predetermined time. Thus, the oil channel 82 is drained for a predetermined time after the shift. Since the fourth speed gear position is selected at this time, the oil channel 83 is drained, and the reduction reducing valve VE operates as a pressure regulating valve. The oil pressure, which is regulated to such an extent as not to engage the reduction brake B3, is supplied to the oil channel 85 from the reduction reducing valve VE.

On passage of the predetermined time, the ATCU 41 turns off the reduction timing solenoid valve SE, and thus, the accumulation control pressure is supplied to the oil channel 82 and acts on the reduction reducing valve VE. The oil pressure, which is regulated to such an extent as to engage the reduction brake B3, is outputted to the oil channel 85. For this reason, in the automatic shift, the reduction brake B3 as a friction element for transmitting a reverse driving force is not engaged for a predetermined time after the shift,. The reduction brake B3 is then engaged on passage of the predetermined time, and this prevents the shock from the shift.

In the case of the manual shift of the gear position, the reduction timing solenoid valve SE is turned off just after the shift. Thus, the accumulation control pressure is supplied to the oil channel 82, and the oil pressure, which is regulated to such an extent as to engage the reduction brake B3, is supplied from the oil channel 85. For this reason, the reduction brake B3 is engaged just after the manual shift, and this completes the change in the gear positions to operate the engine brake immediately. If the R range is designated, the R range pressure supplied to the oil channel 83 is supplied to the oil channel 85 through the reduction reducing valve VE. Therefore, a sufficient engagement pressure for a larger loaded torque is quickly supplied to the reduction brake B3.

It is therefore possible to prevent the shock resulting from the automatic down-shift, quickly change the gear positions in the manual down-shift to operate the engine brake, and engage the reduction brake B3 by the sufficient engagement pressure in the backward driving, with the use of the regulating valves, the shift valves and the timing solenoid valve with small capacities without using the accumulator with a large capacity as in the prior art. This reduces the size of the control device of the automatic transmission.

The oil pressure diverging from the oil channel 85 is supplied to the low reverse brake B1 that is engaged only at the first speed gear position at which the engine brake is operable. This eliminates the necessity of providing a special pressure regulating valve for reducing the engagement pressure applied to the low reverse brake B1, and reduces the size of the control device of the automatic transmission.

If the gear position is shifted to the first speed gear position at which the engine brake is operable, the reduction brake B3 is already engaged at the last gear position. This avoids such a problem that a shock resulting from the engagement, etc. varies the oil pressure when the low reverse brake B1 is engaged, and enables the stable change in the gear positions.

Figure 9:
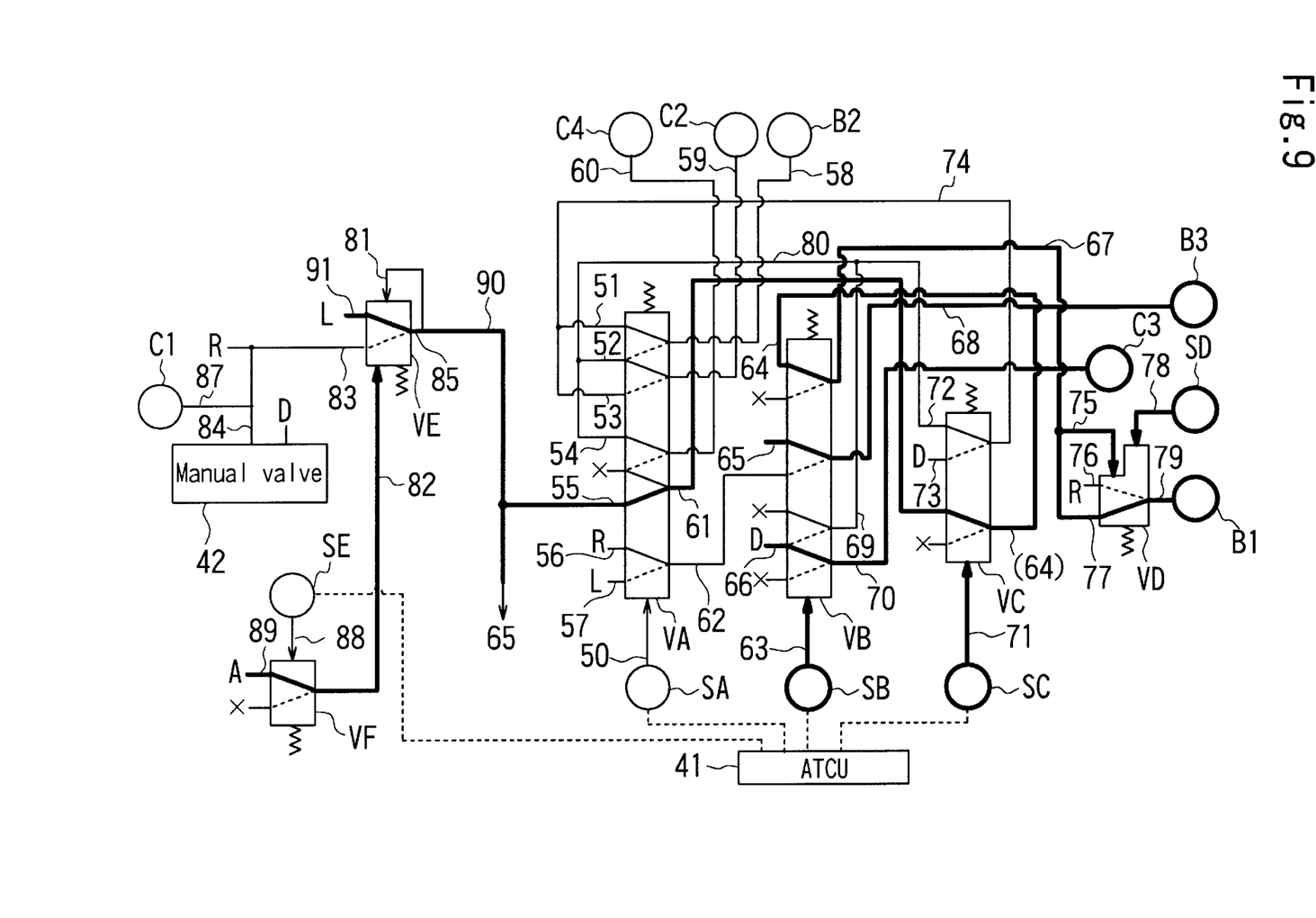
FIG. 9 is a view showing a modification example of the preferred embodiment.

FIG. 9 shows a modification example of the embodiment. The oil channel 85 is connected to the oil channel 90. The oil pressure reduced by the reduction reducing valve VE is supplied to the oil channel 65 connected to the reduction brake B3 and the oil channel 55 connected to the low reverse brake B1, through the oil pressure circuit from the oil channel 90. This eliminates the necessity of providing a special pressure regulating valve for reducing the oil pressure applied to the low reverse brake B1. In this case, the line pressure as the original pressure for pressure regulation is supplied to the reduction reducing valve VE from the oil channel 91.

The output oil channel 85 is connected to the seventh oil channel 55 through the oil channel 90, whereas the oil channel 85 (the output oil channel) and the oil channel 55 (the seventh oil channel) are directly connected in the previously-described embodiment. The other structure of the modification is the same as the embodiment shown in FIG. 3.

In the above embodiment, the present invention is applied to the control device of the automatic transmission, which is provided with the D range, the 4 range, the 3 range, the 2 range and the 1 range. The present invention, however, may be applied to the control device of the automatic transmission, which is provided with a range in which a gear position is manually selected in addition to the D range, the 4 range, the 3 range and the 2 range.

What is claimed is:

1. A control device of an automatic transmission, which comprises a plurality of forward driving gear positions and a backward driving gear position that are achieved by engaging and disengaging a plurality of friction elements and which is capable of changing said plurality of forward driving gear positions by an automatic shift or a manual shift according to driving conditions, said control device of the automatic transmission comprising:

(a) a first friction element that is engaged at least at a lowest speed forward driving gear position or at the backward driving gear position;

(b) a pressure regulating valve that is connected to an output oil channel connected to a first oil channel connected to said first friction element, a second oil channel supplied with an original pressure, a third oil channel that is drained if the forward driving gear position is designated and that is supplied with a rear range pressure if the backward driving gear position is designated, and a fourth oil channel supplied with an oil pressure for changing pressure regulating state, said pressure regulating valve outputting a rear range pressure to said output oil channel if said third oil channel is supplied with the rear range pressure, outputting an oil pressure regulated to such an extent as not to engage said first friction element to said output oil channel if said third oil channel is drained and said fourth oil channel is not supplied with oil pressure, and outputting an oil pressure regulated according to the oil pressure supplied to said fourth oil channel if said third oil channel is drained and said fourth oil channel is supplied with the oil pressure;

(c) a first shift valve that is connected to said fourth oil channel, a fifth oil channel supplied with a control pressure for controlling said pressure regulating valve and a sixth oil channel connected to a timing solenoid valve, said first shift valve supplying a control pressure to said fourth oil channel by connecting said fifth oil channel and said fourth oil channel when said timing solenoid valve is turned off and draining said fourth oil channel when said timing solenoid valve is turned on;

(d) a shift control part that keeps said timing solenoid valve on for a predetermined time when the gear position is automatically shifted from a gear position at which said first friction element is unengaged to a gear position at which said first friction element is engaged, and then turns off said timing solenoid valve; and that switches said timing solenoid valve to an OFF state when the gear position is manually shifted from a gear position at which said first friction element is unengaged to a gear position at which said first friction element is engaged; and (e) wherein an oil pressure for engaging said friction element is supplied to said first oil channel from said pressure regulating valve when said control pressure acts on said pressure regulating valve through said fourth oil channel.

2. A control device of an automatic transmission according to claim 1, further comprising:

(a) a second friction element that is unengaged at a gear position at which said first friction element is unengaged and that is engaged for transmitting a reverse driving force at at least one gear position among gear positions at which said first friction element is engaged;

(b) an oil pressure circuit including a seventh oil channel connected to said output oil channel, an eighth oil channel connected to said second friction element, and at least second shift valve said oil pressure circuit connecting said seventh oil channel and said eighth oil channel if a gear position at which said second friction element is engaged is designated.

3. A control device of an automatic transmission according to claim 2, wherein an original pressure is supplied to said second oil channel through said oil pressure circuit.

4. A control device of an automatic transmission according to claim 1, 2 or 3, wherein said first oil channel connected to said first friction element is directly connected to said output oil channel of said pressure regulating valve.

5. A control device of an automatic transmission according to claim 2, wherein said first oil channel connected to said first friction element is connected to said output oil channel of said pressure regulating valve through said oil pressure circuit.

* * * * *